Figure 1:
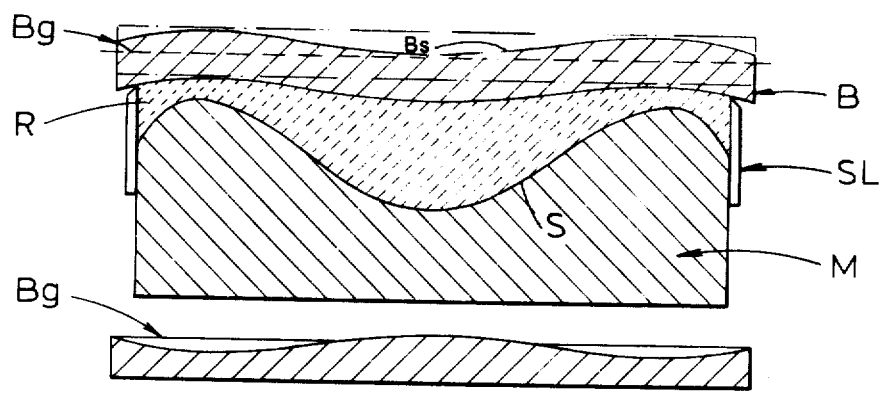

United States Patent [19]
Howden

[11] 3,876,734
[45] Apr. 8, 1975

[54] METHOD FOR THE MANUFACTURE OF OPTICAL ELEMENTS

[75] Inventor: Harry Howden, Near Redhill, England

[73] Assignee: U.S. Philips Corporation, New York, N.Y.

[22] Filed: Aug. 4, 1972

[21] Appl. No.: 278,116

[30] Foreign Application Priority Data
Aug. 9, 1971 United Kingdom............ 37352/71

[52] U.S. Cl................................. 264/1; 264/162
[51] Int. Cl................................. B29d 11/00
[58] Field of Search............................ 264/1, 2, 162

[56] References Cited
UNITED STATES PATENTS
2,911,682  11/1959  Ewald ........................ 264/1
3,211,811  10/1965  Lanman ....................... 264/1
3,497,577  2/1970   Wichterle ................... 264/162

*Primary Examiner*—Robert F. White
*Assistant Examiner*—Gene Auville
*Attorney, Agent, or Firm*—Frank R. Trifari; George B. Berka

[57] ABSTRACT

A method of manufacturing an optical element from a glass blank wherein the deformation of the glass blank to provide a distorted surface which when worked flat will restore to a desired optical shape is effected by causing the blank to adhere to a resin material which is cured in a mould having a surface profile which is a magnified version of the desired optical profile so that distortion of the glass blank is due to shrinkage of the resin material as it cures in the mould.

4 Claims, 3 Drawing Figures

METHOD FOR THE MANUFACTURE OF OPTICAL ELEMENTS

This invention relates to the manufacture of optical elements.

The manufacture of high quality aspheric optical elements in glass can involve lengthy and highly skilled hand working processes. With a view to eliminating the need for much of this skilled work there has previously been proposed an alternative method of manufacture which involves the use of a vacuum frame as described, for example, in "American Journal of Roentgenology and Radium Therapy", Volume 59, January 1948, pages 129 and 130. In this alternative method, a glass blank with two flat surfaces is secured over a vacuum frame which is then evacuated so that the blank is deformed within its elastic limit into the vacuum frame due to the pressure differential across it. In dependence on the shape of the profile that one surface of the blank is to be given to form the optical element, supports may be provided at selected positions in the vacuum frame and these supports are engaged by the deformed blank and determine the shape of its deformation. The outer surface of the blank, is then ground and polished flat, so that when the blank is released from the vacuum frame this outer surface assumes the shape of the desired profile.

However this vacuum frame method of manufacture has the limitations that the profile obtainable is an approximation only and that the amount of deformation that can be achieved (curve steepness or correction factor) is limited by the maximum pressure differential of about 15 p.s.i. (i.e. atmospheric pressure unless the outer surface of the blank can be worked in an environment in which a pressure greater than atmospheric pressure is present).

It is an object of the present invention to provide an improved method for the manufacture of optical elements which involves deformation of a glass blank, or a blank of other suitable light-transmissive material, but in which the pressure available for the deformation is far greater than with the vacuum frame method and in which the profile accuracy that can be obtained is not restricted by the mechanical limitations of deforming a glass blank over the edges of a vacuum frame with or without profile-determining supports.

According to the present invention a method of manufacturing an optical element from a blank of light-transmissive material consists in supporting the blank with one surface in proximity with a mould surface that has a profile which is a magnification of a required optical profile in a direction normal to said one surface, filling the region between said surfaces with an adhesive resin material that is known to shrink on curing by a predetermined amount, causing the resin material to cure with it adhered to both said surfaces so that the blank is deformed, optically working flat the other, outer surface of the blank, and releasing the worked blank from the cured resin material, the magnification factor of the mould surface profile being an inverse function of the percentage shrinkage of said resin material, but not being sufficiently large to cause deformation of the blank beyond its elastic limit.

The method according to the invention enables much steeper curves to be produced, as compared with the known vacuum frame method, in the manufacture of an optical element because the pressure that can be exerted on a blank by the adhesive resin material to deform it is far greater than atmospheric pressure. Alternatively, stronger blanks (i.e. with an increased thickness to diameter ratio) can be used to make optical elements because of the increased available pressure. Furthermore, the profile accuracy of an optical element is improved for two reasons. Firstly, the magnified mould surface profile can be shaped accurately, for instance by machining this surface on one face of a rigid metal block, instead of relying on supports which necessitate extensive calculation and experimentation to obtain the best compromise profile as in the vacuum frame method. Secondly, any errors in the mould surface profile are diminished by the magnification factor in the optical profile of the manufactured optical element.

In carrying out the invention, the region between the mould surface and the facing surface of the blank is preferably bounded by a member on which said blank is supported and which is displaceable with respect to the blank in said direction (normal to the blank) to allow deformation of the blank adjacent its edge.

Figure 2:
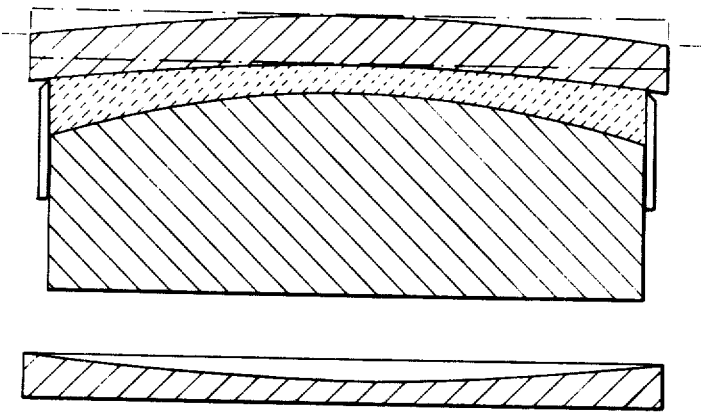
Figure 3:
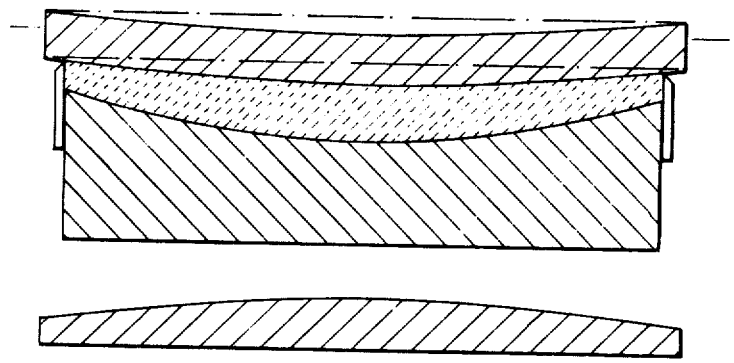

In order that the invention may be more fully understood reference will now be made by way of example to the accompanying drawing of which:

FIGS. 1 to 3 illustrate, respectively, the method of manufacture according to the invention as applied to three different types of optical element.

Referring to the drawing, in FIG. 1 a rigid mould block M has a mould surface S that has a profile which is a magnification of a required optical profile for a Schmidt corrector plate. The magnification factor of the mould surface profile is suitably between 10 and 50. A blank B of glass, or other suitable light-transmissive material, is placed in proximity to the block and supported on a sleeve SL which is free to slide, under the influence of an applied force, with respect to theh block M. The gap thus formed between the blank B and the mould surface S is then filled with a resinous material R whose properties are that it shrinks on curing by a predetermined amount (e.g. about 3 percent), and also adheres to both the blank B and the block M (whose relevant surfaces are previously treated in known manner if necessary) sufficiently well to prevent the bond being broken under the pressure exerted in a direction normal to the blank B due to shrinkage of the resinous material as it cures. When the resinous material has cured, the blank B is deformed as shown and the upper surface Bs of the blank B now has a profile which is in direct proportion to the shrinkage factor of resinous material R and the profile of the mould surface S. This upper surface Bs is now ground and polished flat to the surface Bg, after which the blank B is released by the discrete application of a force specifically higher than the force of adhesion between the cured resinous material and the blank B, or by other means such as the application of heat depending on the type of resinous material used. On release, the blank B restores from its deformation and the worked (previously flat) surface Bg assumes the optical profile for a Schmidt corrector plate.

The combination of the percentage shrinkage of the resinous material and the magnification factor of the mould surface profile should be such as not to cause deformation of the blank B beyond its elastic limit.

The resinous material is suitably an epoxy resin and hardener, for example epoxy resin type MY 750 and hardener type 956 Such an epoxy resin undergoes a 2-3 percent shrinkage on curing.

The mould block M is suitably a rigid metal block on which the profile of the mould surface S has been machined using convential machining techniques.

FIG. 2 illustrates the manufacture of a plano-concave lens and FIG. 3 illustrates the manufacture of a plano-convex lens, in conformity with the invention. In each instance, the manufacturing steps are as described with reference to FIG. 1, except for the use of a different mould surface profile.

What we claim is:

1. A method of manufacturing an optical element from an elastic blank of light-transmissive material, comprising the steps of supporting the blank with one surface in proximity with a mould surface that has a profile which is a magnification of a required optical profile in a direction normal to said one surface, filling the region between said surfaces with an adhesive resin material that is known to shrink on curing by a predetermined amount, causing the resin material to cure with it adhered to both said surfaces so that the blank is deformed, optically working the other, outer, surface of the blank, and releasing the worked blank from the cured resin material to thus produce said required optical profile on said surface, the magnification factor of the mould surface profile being inversely related to the percentage shrinkage of said resin material, but not being sufficiently large to cause deformation of the blank beyond its elastic limit.

2. A method as claimed in claim 1, for which the resin material is an epoxy resin.

3. A method as claimed in claim 2, wherein the shrinkage of the epoxy resin is between 2 and 3 percent.

4. A method as claimed in claim 1, wherein said light-transmissive material is glass and the magnification factor of the mould surface profile is between 10 and 50.

* * * * *